(12) United States Patent
Kempass

(10) Patent No.: US 11,937,606 B2
(45) Date of Patent: Mar. 26, 2024

(54) DEVICE FOR PRODUCING A WAFER CUP

(71) Applicant: WALTERWERK KIEL GMBH & CO. KG, Kiel (DE)

(72) Inventor: Dieter Kempass, Kiel (DE)

(73) Assignee: WALTERWERK KIEL GMBH & CO. KG, Kiel (DE)

(*) Notice: Subject to any disclaimer, the term of this patent is extended or adjusted under 35 U.S.C. 154(b) by 5 days.

(21) Appl. No.: 17/772,393

(22) PCT Filed: Nov. 23, 2020

(86) PCT No.: PCT/EP2020/083037
§ 371 (c)(1),
(2) Date: Apr. 27, 2022

(87) PCT Pub. No.: WO2021/144054
PCT Pub. Date: Jul. 22, 2021

(65) Prior Publication Data
US 2022/0378053 A1 Dec. 1, 2022

(30) Foreign Application Priority Data
Jan. 15, 2020 (EP) ..................................... 20000017

(51) Int. Cl.
*A21C 15/02* (2006.01)
(52) U.S. Cl.
CPC .................................. *A21C 15/025* (2013.01)
(58) Field of Classification Search
CPC ...... A21C 15/02; A21C 15/022; A21C 15/025; A21C 7/04; B29C 51/087; B29C 51/20; B29C 51/32; B29C 51/34; B29C 51/306; B29C 2033/207; A23P 30/10; B65H 67/065
See application file for complete search history.

(56) References Cited

U.S. PATENT DOCUMENTS 4,383,819 A * 5/1983 Letica .................... B29C 45/33
249/58
2006/0038310 A1 2/2006 Lipson

FOREIGN PATENT DOCUMENTS

CN 102433996 5/2012
CN 202377371 8/2012
(Continued)

OTHER PUBLICATIONS

Machine English translation of Garello J (FR-2577760-A) (Year: 1986).*
(Continued)

*Primary Examiner* — Jeffrey M Wollschlager
*Assistant Examiner* — Edgaredmanuel Troche
(74) *Attorney, Agent, or Firm* — Diederiks & Whitelaw, PLC.

(57) ABSTRACT

The invention relates to a device for producing a wafer cup, comprising a mold core and a die. The die has a base and a plurality of wall segments which are connected to the base in an articulated manner. A mechanism is provided for pivoting the wall segments from a first position, in which the base forms a support for receiving a wafer sheet that extends over the base (32), into a second position, in which the wall segments form a wall that surrounds the base and extends substantially perpendicularly from the base, thereby setting the wafer sheet sections extending over the region of the base against the mold core.

18 Claims, 10 Drawing Sheets

(56) References Cited

FOREIGN PATENT DOCUMENTS

| | | | | |
|---|---|---|---|---|
| CN | 104438539 | | 3/2015 | |
| CN | 205585186 | | 9/2016 | |
| CN | 107996659 | | 5/2018 | |
| CN | 110202752 | | 9/2019 | |
| CN | 209396076 | | 9/2019 | |
| DE | 102013012165 B4 | * | 8/2015 | ............. A21C 15/02 |
| FR | 2577760 | | 8/1986 | |
| FR | 2577760 A | * | 8/1986 | ............. A21B 5/026 |
| WO | 9508268 | | 3/1995 | |
| WO | WO-9508268 A1 | * | 3/1995 | ............. A21B 5/026 |
| WO | WO-9604797 A1 | * | 2/1996 | ............. A21C 11/00 |

OTHER PUBLICATIONS

Machine English translation of Villaret R (WO-9604797-A1) (Year: 1996).*

Machine English translation of Mersmann G (DE 102013012165 B4) (Year: 2015).*

* cited by examiner

DEVICE FOR PRODUCING A WAFER CUP

CROSS-REFERENCE TO RELATED APPLICATIONS

This application represents the U.S. National Phase of International Application number PCT/EP2020/083037, entitled "Device for Producing a Wafer Cup", filed on 23 Nov. 2020, claiming priority to application number EP20000017.2, filed 15 Jan. 2020, all of which are incorporated herein by reference.

BACKGROUND OF THE INVENTION

The invention relates to a device for producing a wafer cup, which device has a mold core and a female mold.

Wafers made from dough are often used not only as stand-alone snacks, but also in the form of wafer cones and wafer cups for holding food, for example as an ice cream cone or as edible tableware. While wafer cones can be produced relatively easily and with high quality by rolling up flat-baked wafer sheets, the production of wafer cups—depending on the method used—leads to very different results in terms of quality.

For example, during the production of wafer cups, the wafer sheet is greatly stretched by thermoforming in the region of the base, which can result in the formation of holes from which the filling material used can escape during the coating or filling of the wafer cup. This effect is exacerbated by the irregular or uncontrolled formation of folds and the resulting increase in resistance during thermoforming.

On the other hand, an alternative method is made possible with the device known from WO 95/08268 A1, in which wafer cups with a corrugated rim can be produced by means of an upper mold and a lower mold. This is done by shaping a flat wafer sheet which is applied by means of pivotable mold elements arranged on the upper mold to likewise pivotable mold elements arranged on the lower mold. The formation of the wafer sheet as a wafer cup thus takes place between the upper mold, which acts as a female mold, and the lower mold, which acts as a mold core, of the known device.

Although the disadvantages of thermoforming can be avoided in principle with the known device, the equipment structure required for this is considerable. In particular, it is necessary to synchronize the movement of the molds, which act independently of one another, using a plurality of stepping motors having a plurality of belt drives. The device known from WO 95/08268 A1 therefore has a disadvantageously complex structure which is also prone to failure due to the large number of elements moving in relation to one another.

Finally, FR 2 577 760 A1 discloses a device having the features of the preamble of claim 1 by means of which wafer cups having a corrugated rim can indeed be produced, but there is also the risk of holes or folds forming in the wafer sheet in this previously known construction.

SUMMARY OF THE INVENTION

It is therefore the object of the invention to provide a simple device for producing a wafer cup which is scarcely prone to failure and avoids the formation of holes and folds in the wafer sheet.

This object is achieved according to the invention by the device having the features of claim 1. The dependent claims reflect advantageous embodiments of the invention.

The basic concept of the present invention is to provide a simple device for producing a wafer cup, by means of which a wafer sheet can be applied to a mold core by folding pivotable wall segments that form the female mold, without holes or folds forming in the wafer sheet. In this case, the mold core is used in particular as a drive for the movement of the wall segments, and so there is no need for a complex and therefore failure-prone equipment structure.

According to the invention, a device comprising a mold core and a female mold is proposed for producing a wafer cup, in which the female mold has a base and a plurality of wall segments hingedly connected to the base, and means for pivoting the wall segments from a first position in which the base forms a support for receiving a wafer sheet that extends beyond the base into a second position in which the wall segments form a wall which encloses the base and extends substantially perpendicularly from the base, with the portions of the wafer sheet that extend beyond the region of the base being applied to the mold core, the mold core and the base being mounted so as to be displaceable relative to the means.

The drive required for carrying out the pivoting movement of the device as a whole is effected solely by a linear downward movement of the mold core. The wafer sheet resting on the base is clamped between the base and the mold core lowered in the direction of the base and, with its portions that extend beyond the base, is pressed against the mold core by an upward pivoting movement of the wall segments when the mold core and base move further downward together due to the mold core, so that a (preferably round and smooth-edged) wafer cup is produced.

According to the invention, the holder has two levels arranged one above the other, with a first group of wall segments being connected to the first level of the holder by means of a first group of arms and a second group of wall segments being connected to the second level of the holder by means of a second group of arms. The wall segments of the first group of wall segments and the wall segments of the second group of wall segments are arranged alternately on the circumference of the base. Because of this design, the wall segments are advantageously applied in two portions that are temporally separated, so that a random formation of folds in the wall region of the wafer cup can be avoided.

The mold core is designed in particular as a truncated cone, with the top surface of the truncated cone facing the base. In this case, the wall segments are positioned obliquely outward starting from the base and, together with the base, form the negative mold for the mold core designed as a truncated cone.

The base is preferably mounted on the means, namely on the holder.

A particularly simple and useful embodiment of the invention is achieved in that the mold core is mounted so as to be displaceable relative to the base and is designed to cause the base to be displaced relative to the means. The base can particularly preferably be mounted against the force of a spring so that the device automatically returns from the second position to the first position when the mold core is raised and can release the wafer cup formed in the second position.

According to a further preferred embodiment, the wall segments are designed as a first group of wall segments forming a first shape and a second group of wall segments forming a second shape. Particularly preferably, the inner lateral surface of the first group of wall segments that faces the mold core has a smaller area than the inner lateral surface of the second group of wall segments that faces the mold core. In this case, one group of wall segments most preferably has a guide for the other group of wall segments. In particular, the wall segments of the first group of wall segments and the wall segments of the second group of wall segments are arranged alternately on the circumference of the base for this purpose.

This embodiment has proven to be very advantageous: in a first step, the wafer sheet is thus pre-fixed to the mold core by means of the wall segments having a smaller inner lateral surface, with the final formation of the wafer cup wall taking place in a second step by pivoting the wall segments having a larger inner lateral surface.

Finally, the lateral surface of the mold core or in particular the inner lateral surface of at least one wall segment can also have an embossing, for example in the form of a logo or a product or company name. This embodiment makes it possible to provide the outside of the wafer cup with a relief-like decoration, which can also take the form of an image and/or writing.

BRIEF DESCRIPTION OF THE FIGURES

The invention is explained in more detail below with reference to a particularly preferred embodiment shown in the attached drawings, in which.

DETAILED DESCRIPTION OF THE PREFERRED EMBODIMENTS

Figure 1:
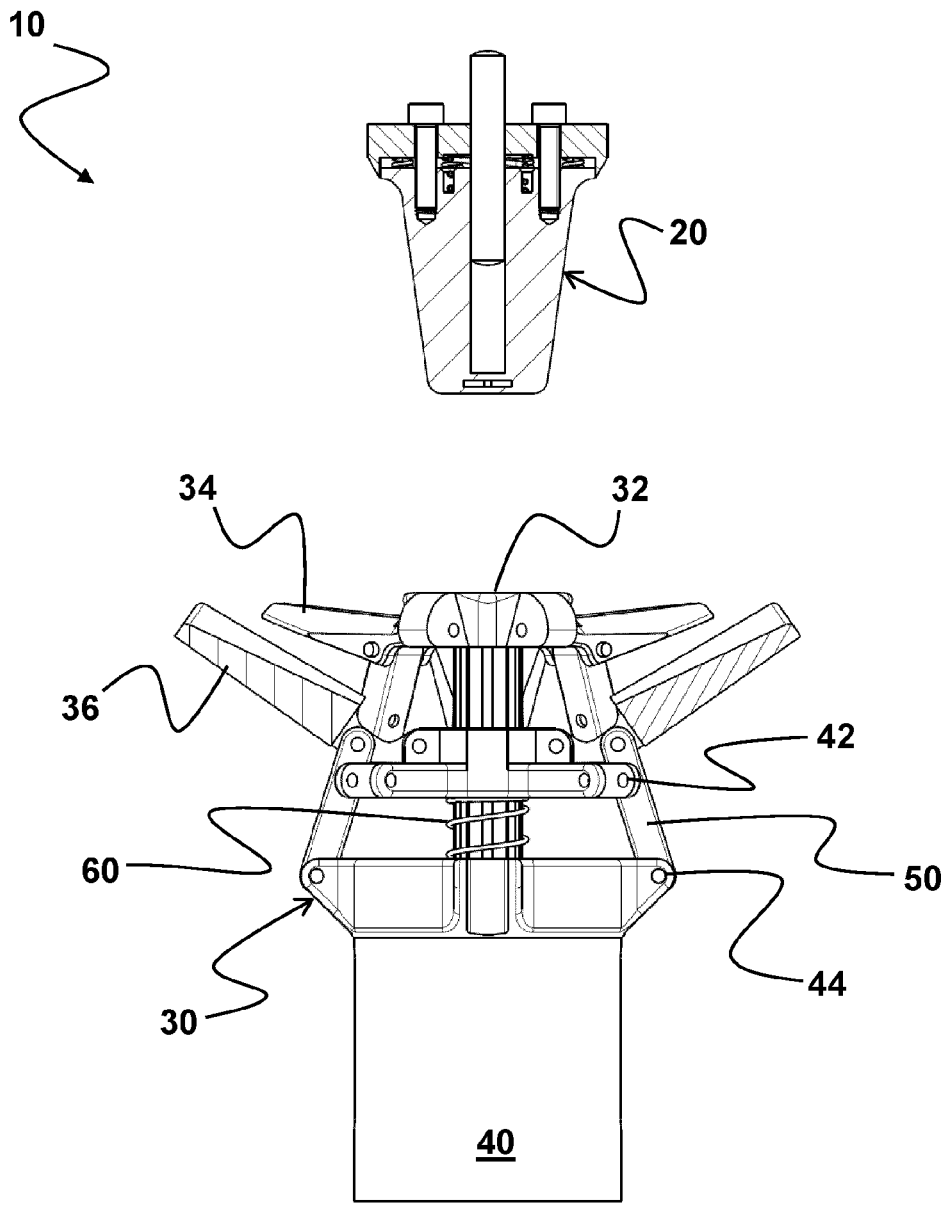
FIG. 1 is a sectional view of a first preferred embodiment according to the invention.

FIG. 1 is a sectional view of a first preferred embodiment according to the invention. In particular, FIG. 1 shows a device 10 for producing a wafer cup, comprising a mold core 20 designed as a truncated cone and a female mold 30. The female mold 30 has a base 32 and a plurality of wall segments 34, 36 hingedly connected to the base 32. In the first position shown, the base 32 forms a support for receiving a wafer sheet that extends beyond the base 32, with the wall segments 34, 36 being transferable, mediated by the movement of the mold core 20 and by the means 40, 42, 44, 50 for pivoting the wall segments 34, 36, into a second position in which the wall segments 34, 36 apply the portions of the wafer sheet that extend beyond the region of the base 32 to the mold core 20 and form a wafer cup from the wafer sheet. The wall segments 34, 36 form a wall which encloses the base 32 and extends substantially perpendicularly from the base 32.

In the example shown, the means 40, 42, 44, 50 for pivoting the wall segments 34, 36 consist of a holder or housing 40 and a plurality of arms 50 which are each hingedly connected at one end to the holder 40 and at the other end to one wall segment 34, 36. The mold core 20 and the base 32 are mounted so as to be displaceable relative to the means 40, 42, 44, 50, the mold core 20 being guided in the direction of the base 32 of the female mold 30 and displacing the base 32 in the direction of the holder 40 while executing the pivoting movement of the wall segments 34, 36. In the present case, the base 32 is mounted on the holder 40 so as to be displaceable and is mounted against the force of a spring 60.

The holder 40 has two levels 42, 44 arranged one above the other, with a first group of wall segments 34 being connected to the first level 42 of the holder 40 by means of a first group of arms 50 and a second group of wall segments 36 being connected to the second level 44 of the holder 40 by means of a second group of arms 50. The arms 50 are in particular of the same length, so that the device 10 can be manufactured in a particularly simple manner.

It can also be seen that the wall segments 34, 36 are designed as a first group of wall segments 34 forming a first shape and a second group of wall segments 36 forming a second shape. The inner lateral surface of the first group of wall segments 34 that faces the mold core 20 has a smaller area than the inner lateral surface of the second group of wall segments 36 that faces the mold core 20.

In particular, the wall segments 34 having a smaller inner lateral surface that faces the mold core 20 are connected to the first plane 42 of the holder 40 by means of the arms 50, and the wall segments 36 having a larger inner lateral surface that faces the mold core 20 are connected to the second plane 44 of the holder 40 by means of the arms 50. The wall segments 34 of the first group of wall segments 34 and the wall segments 36 of the second group of wall segments 36 are arranged alternately on the circumference of the base 32.

Figure 2:
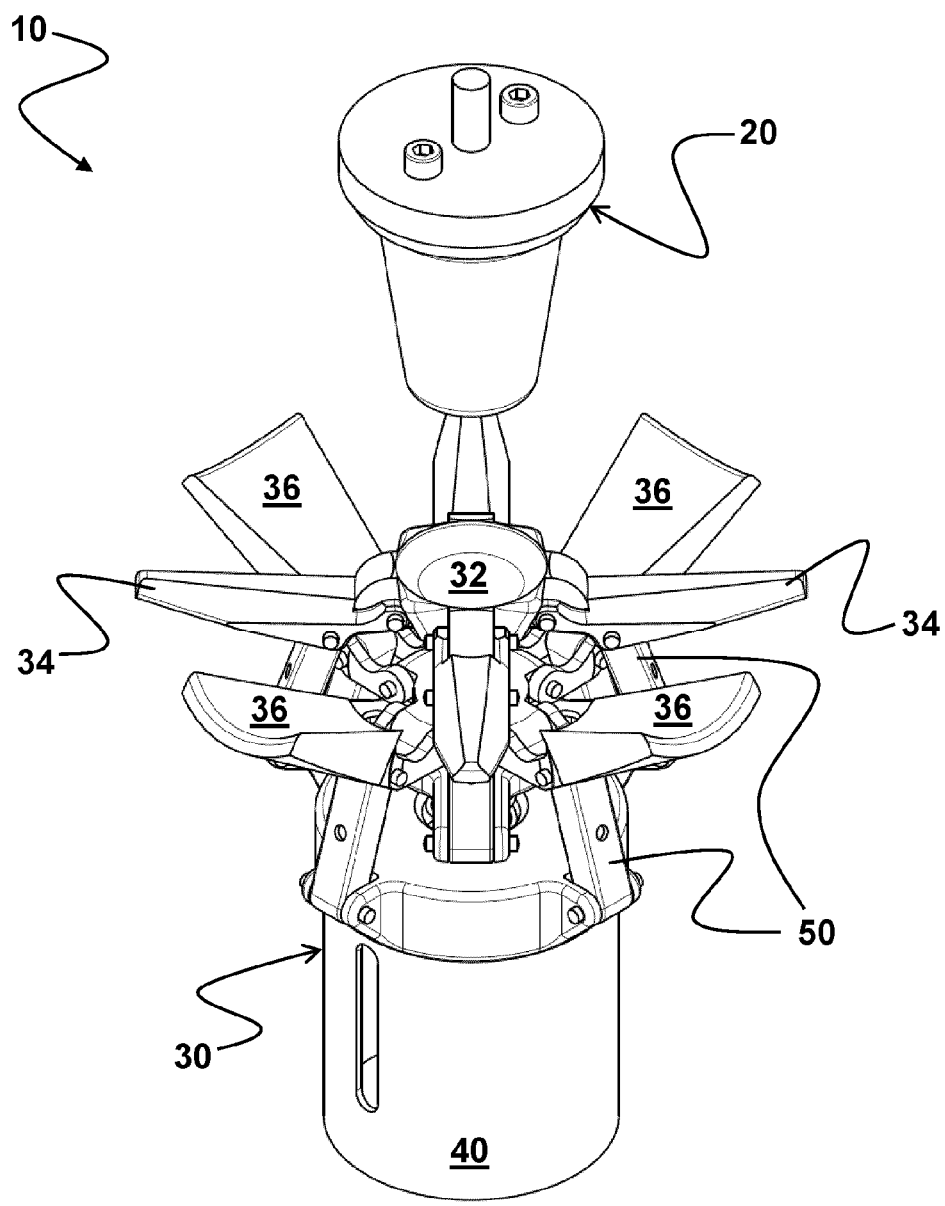
FIG. 2 is a perspective view of the first preferred embodiment in a first position assumed by the mold core.
Figure 3:
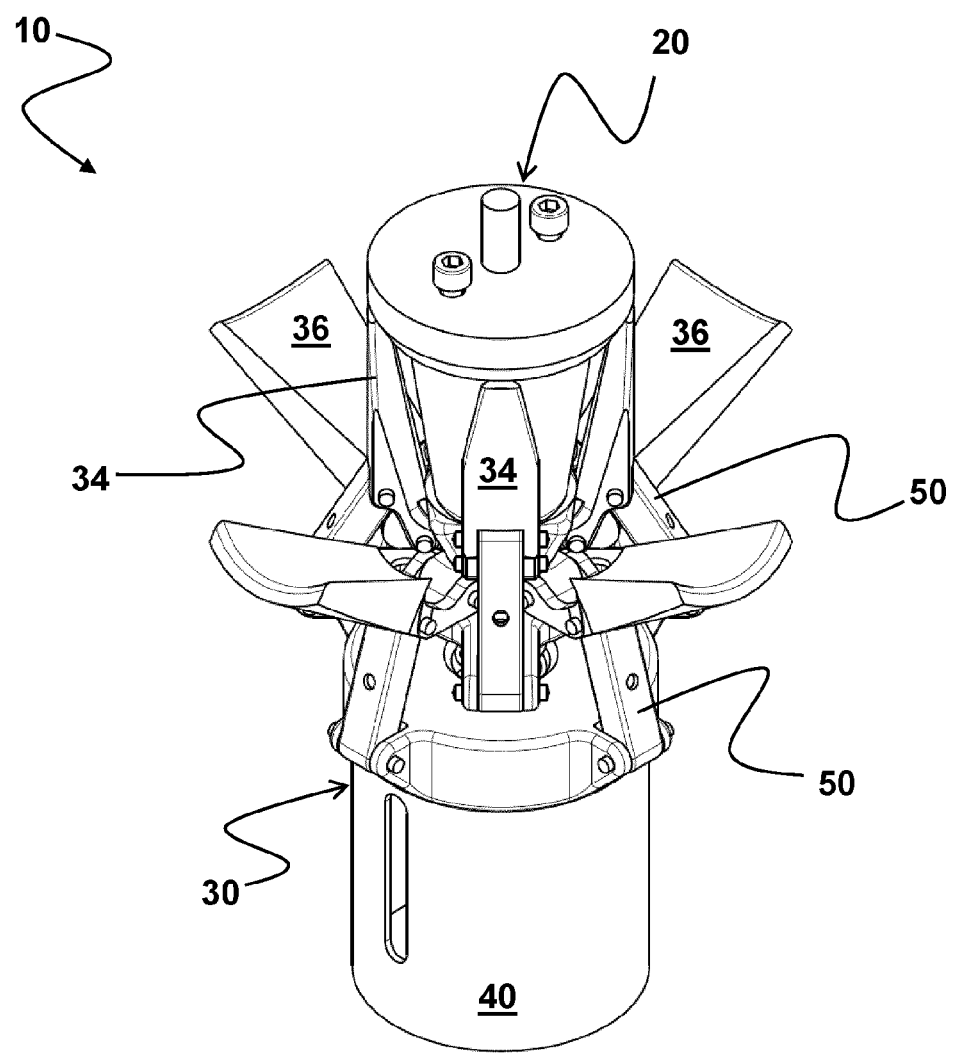
FIG. 3 is a perspective view of the first preferred embodiment in a second position assumed by the mold core.

Due to this structure—starting from the first position also shown in perspective view in FIG. 2—the wall segments 34 which have a smaller inner lateral surface are first folded against the mold core 20 when the mold core 20 acts on the base 32 and the base 32 is displaced in the direction of the holder 40—as shown in FIG. 3—so that the wafer sheet (not shown) is clamped between the mold core 20 and the base 32 of the female mold 30 and is lifted laterally in the regions of the smaller wall segments 34 that extend beyond this region.

Figure 4:
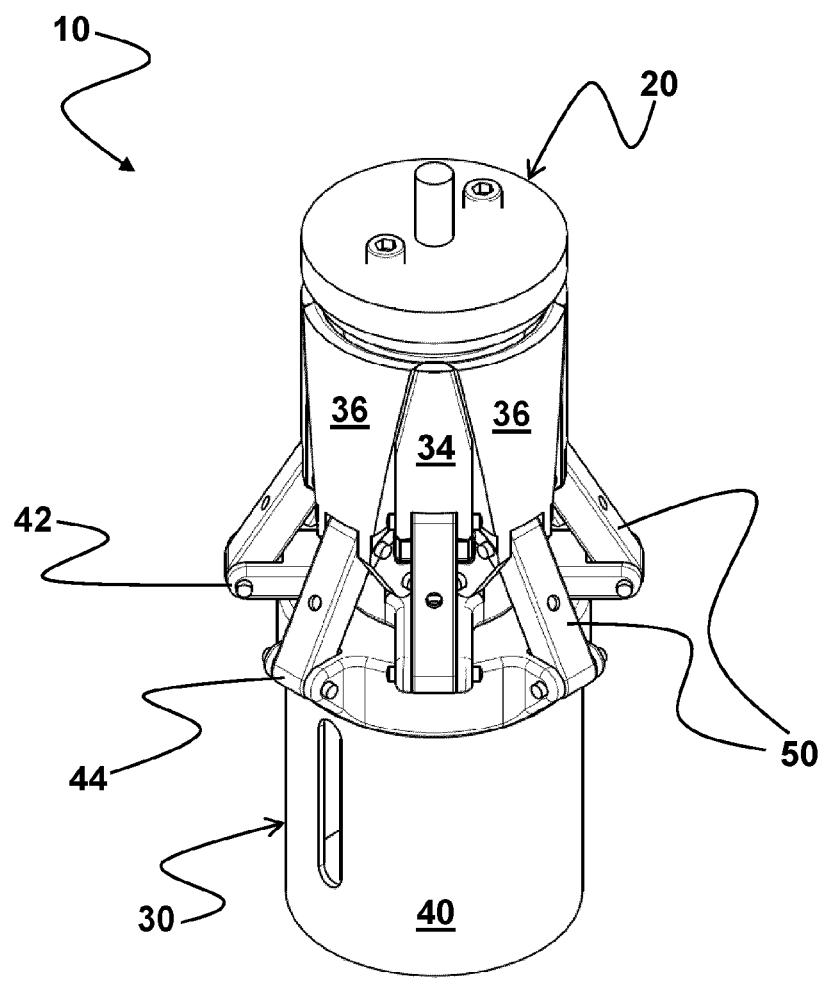
FIG. 4 is a perspective view of the first preferred embodiment in a third position assumed by the mold core.

The wall segments 36 having a larger inner lateral surface which are arranged between the wall segments 34 having a smaller inner lateral surface are also pivoted such that they are applied to the mold core 20 when the mold core 20 and base 32 move further downward together, so that the third position shown in FIG. 4 is reached, in which the wall segments 34, 36 form a wall which laterally encloses the base 32 and the mold core. The wafer sheet enclosed between the mold core 20 and the female mold 30 formed by the wall segments 34, 36 thus assumes the shape of a wafer cup without stress occurring which would damage the wafer sheet.

Figure 5:
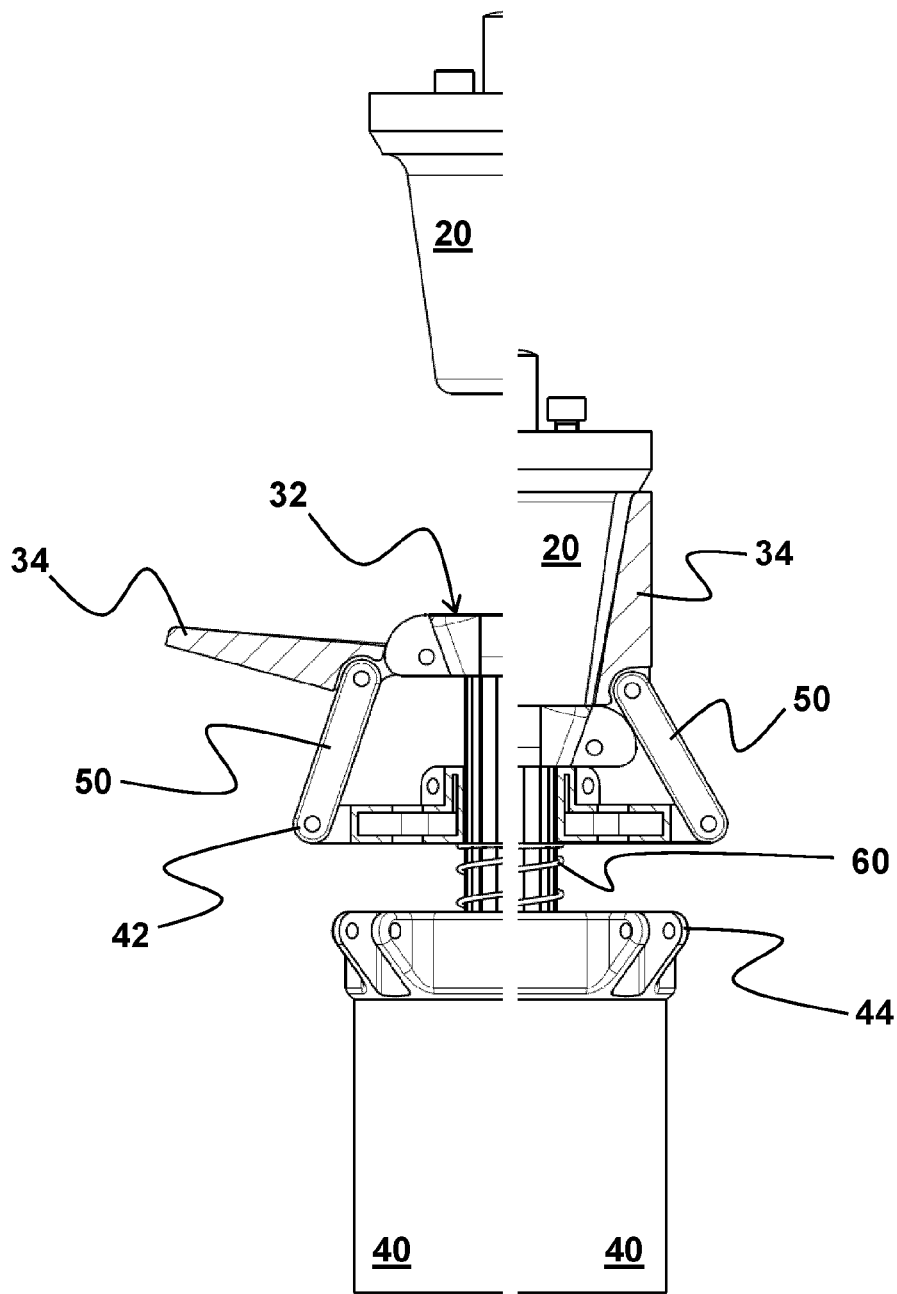
FIG. 5 is a sectional view of the first preferred embodiment in the first position (left) and third position (right) assumed by the mold core.
Figure 6:
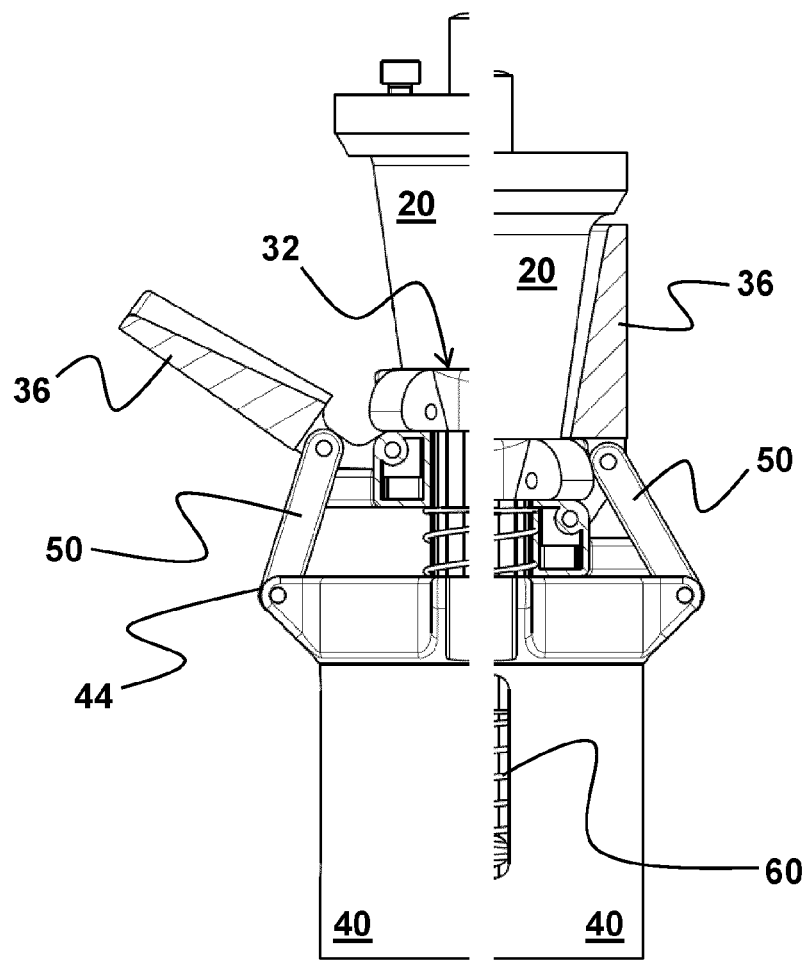
FIG. 6 is a sectional view of the first preferred embodiment rotated by 45° about its longitudinal axis in the second position (left) and third position (right) assumed by the mold core.

FIG. 5 and FIG. 6 again show partial sectional views of the first embodiment in the first position and in the second position in each case for the first group of wall segments 34 and the second group of wall segments 36. It can be clearly seen that the downward movement of the base 32 of the female mold 30, mediated by the mold core 20, relative to the holder 40 on which the base 32 is displaceably mounted against the force of the spring 60 leads to an upward pivoting movement of the wall segments 34, 36, which, in the second position, are applied to the mold core 20 to form the wafer sheet as a wafer cup.

To remove the wafer cup from the device 10, the mold core 20 is lifted and the wall segments 34, 36 hingedly connected to the base 32 automatically move back to their starting position and release the wafer cup resting on the base 32 of the female mold 30.

Figure 7:
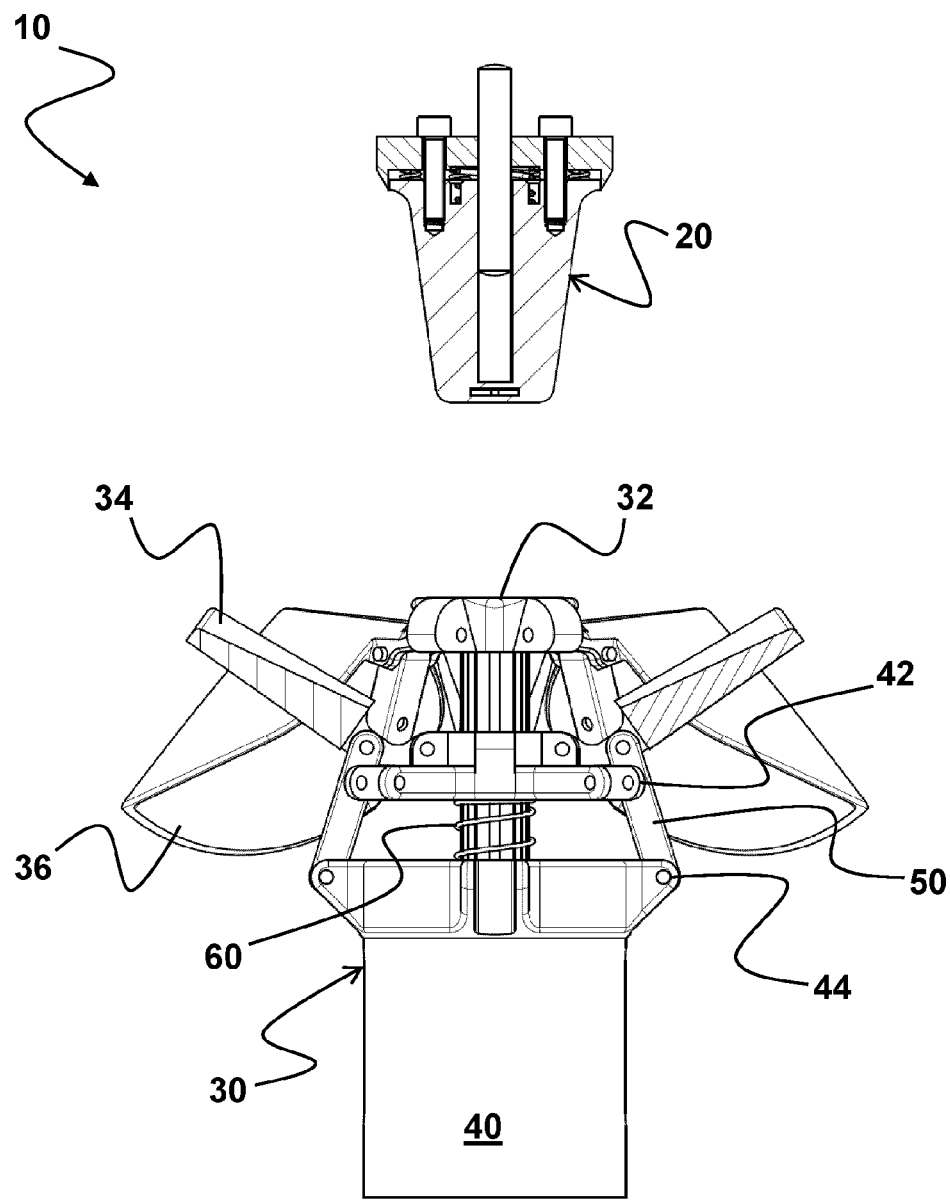
FIG. 7 is a sectional view of a second preferred embodiment according to the invention.
Figure 8:
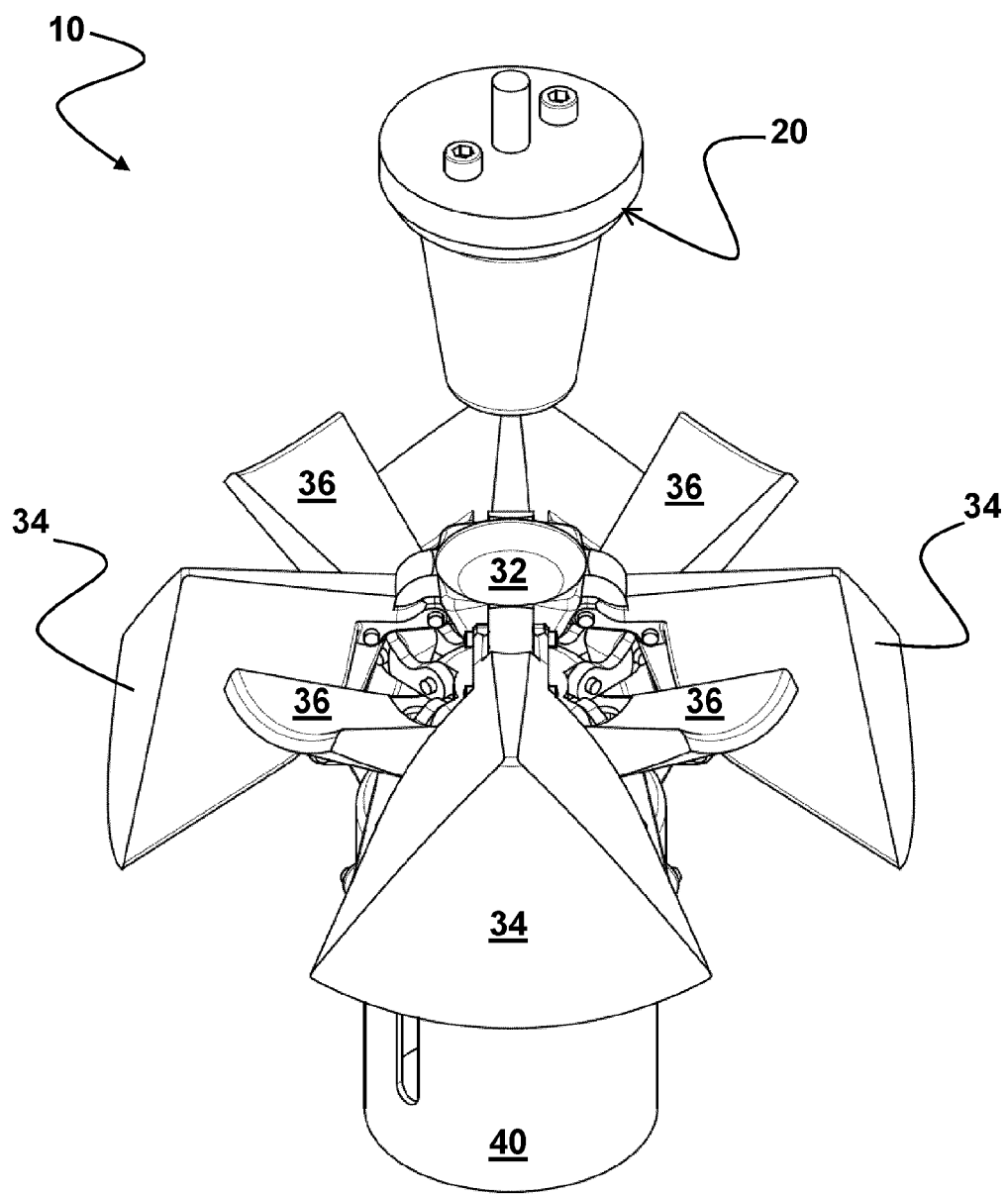
FIG. 8 is a perspective view of the second preferred embodiment in a first position assumed by the mold core.
Figure 9:
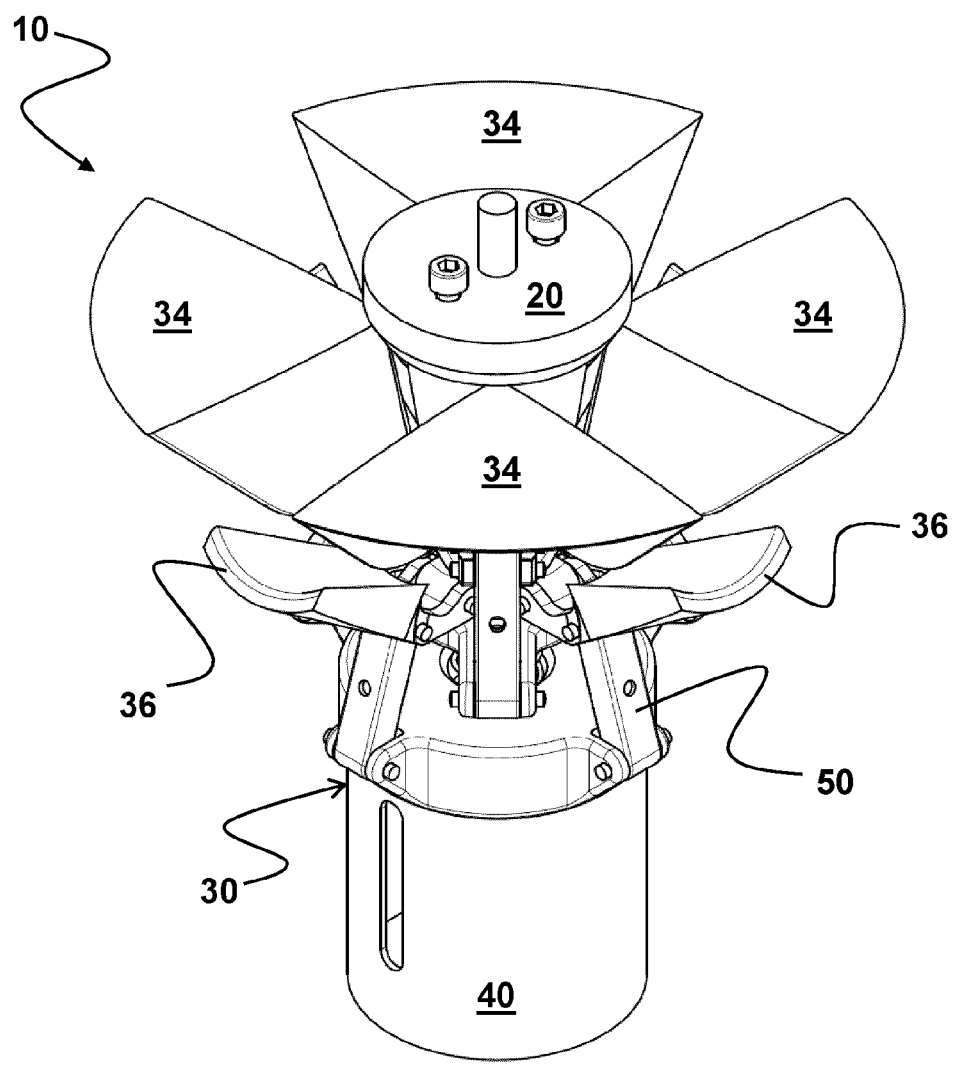
FIG. 9 is a perspective view of the second preferred embodiment in a second position assumed by the mold core.
Figure 10:
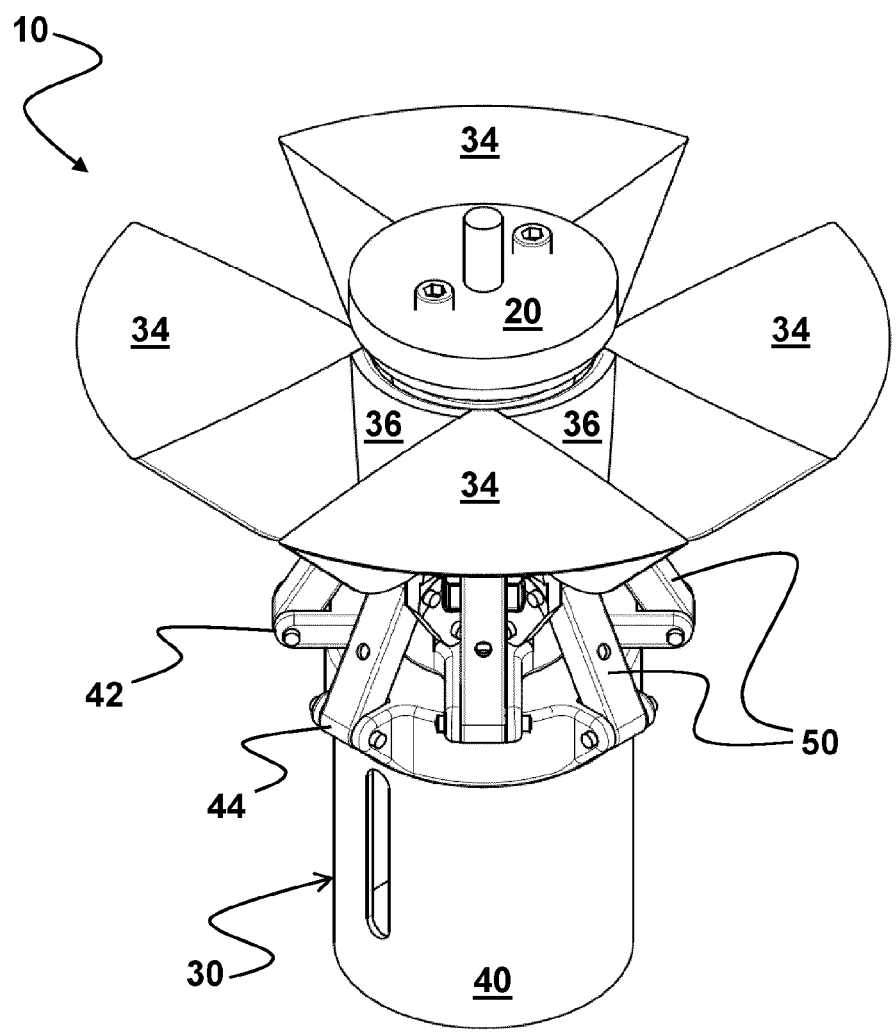
FIG. 10 is a perspective view of the second preferred embodiment in a third position assumed by the mold core.

FIG. 7 then shows a sectional view of a further preferred embodiment according to the invention, and the movement sequence of this preferably designed device 10 is illustrated in the perspective views of FIGS. 8, 9 and 10.

The mechanism of this second embodiment is constructed identically to the mechanism i.e. hinge assembly of the above-mentioned first embodiment. What is different, however, is the shaping of the first wall segments 34 and the second wall segments 36. It is true that in this example, too, the inner lateral surfaces of the wall segments 34, 36 are designed differently, analogously to the first example. On the other hand, the shape of the wall segments 34, 36 that faces away from the inner lateral surface or is arranged laterally to it, in particular the wall segments 34 having a smaller inner lateral surface, is clearly different. These are in fact designed in such a way that the opposing side walls of the wall segments 34 form pockets into which the wafer sheet can protrude when the wall segments 34 having a smaller inner lateral surface are applied to the mold core 20.

At the same time, the side walls of the wall segments 34 having a smaller inner lateral surface each form a guide for the wall segments 36 of the other group of wall segments 36 having a larger inner lateral surface. This design allows the portions of the wafer sheet that extend beyond the base 32 to be completely received and pressed against the mold core 20 so that a smooth cup wall with a smooth cup rim can be formed.

The invention claimed is:

1. An apparatus for producing a wafer cup, comprising
    a mold core and
    a female mold, wherein the female mold has a base and a plurality of wall segments hingedly connected to the base, and
    a hinge assembly for pivoting the wall segments from a first position in which the base forms a support configured to receive a wafer sheet that extends beyond the base into a second position in which the wall segments form a wall which encloses the base and extends substantially perpendicularly from the base, with the portions of the wafer sheet that extend beyond the region of the base being applied to the mold core, the mold core and the base are mounted so as to be displaceable relative to the hinge assembly,
    wherein the hinge assembly has:
    a housing having two levels arranged one above the other,
    a first group of wall segments which are connected to the first level of the housing by a first group of arms, and
    a second group of wall segments which are connected to the second level of the housing by a second group of arms, wherein
    the arms are each hingedly connected at one end to the first level or the second level of the housing and at the other end to one wall segment of the first group or the second group, and
    the wall segments of the first group of wall segments and the wall segments of the second group of wall segments are arranged alternately on the circumference of the base and being configured to form the wafer cup without holes or folds.

2. The apparatus according to claim 1, wherein the base is mounted on the housing.

3. The apparatus according to claim 2, wherein the mold core is mounted so as to be displaceable relative to the base and is designed to cause the base to be displaced relative to the hinge assembly.

4. The apparatus according to claim 2, wherein the base is mounted against the force of a spring.

5. The apparatus according to claim 2, wherein the wall segments are designed as a first group of wall segments forming a first shape and a second group of wall segments forming a second shape.

6. The apparatus according to claim 5, wherein the inner lateral surface of the first group of wall segments that faces the mold core has a smaller area than the inner lateral surface of the second group of wall segments that faces the mold core.

7. The apparatus according to claim 6, wherein the wall segments of one group of wall segments each have a support for the wall segments of the other group of wall segments.

8. The apparatus according to claim 2, further comprising a positive guide guiding the base relative to the hinge assembly.

9. The apparatus according to claim 2, wherein the inner lateral surface of at least one wall segment has an embossing.

10. The apparatus according to claim 1, wherein the mold core is mounted so as to be displaceable relative to the base and is designed to cause the base to be displaced relative to the hinge assembly.

11. The apparatus according to claim 10, wherein the base is mounted against the force of a spring.

12. The apparatus according to claim 10, wherein the wall segments are designed as a first group of wall segments forming a first shape and a second group of wall segments forming a second shape.

13. The apparatus according to claim 1, wherein the base is mounted against the force of a spring.

14. The apparatus according to claim 1, wherein the wall segments are designed as a first group of wall segments forming a first shape and a second group of wall segments forming a second shape.

15. The apparatus according to claim 14, wherein the inner lateral surface of the first group of wall segments that faces the mold core has a smaller area than the inner lateral surface of the second group of wall segments that faces the mold core.

16. The apparatus according to claim 15 wherein the wall segments of one group of wall segments each have a support for the wall segments of the other group of wall segments.

17. The apparatus according to claim 1, further comprising a positive guide guiding the base relative to the hinge assembly.

18. The apparatus according to claim 1, wherein the inner lateral surface of at least one wall segment has an embossing.

* * * * *